US011934112B2

(12) United States Patent
Miyazaki et al.

(10) Patent No.: US 11,934,112 B2
(45) Date of Patent: Mar. 19, 2024

(54) IMAGE FORMING APPARATUS HAVING A CONTROL MODE TO VIBRATE A DATA RECORDING MEDIUM

(71) Applicants: Susumu Miyazaki, Tokyo (JP); Munenori Kimura, Kanagawa (JP); Tetsuya Yano, Kanagawa (JP); Kyohei Matsumura, Kanagawa (JP)

(72) Inventors: Susumu Miyazaki, Tokyo (JP); Munenori Kimura, Kanagawa (JP); Tetsuya Yano, Kanagawa (JP); Kyohei Matsumura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/970,582

(22) Filed: Oct. 21, 2022

(65) Prior Publication Data

US 2023/0152733 A1 May 18, 2023

(30) Foreign Application Priority Data

Nov. 17, 2021 (JP) ................................ 2021-186872

(51) Int. Cl.

*G03G 15/08* (2006.01)
*G03G 15/00* (2006.01)
*G03G 21/16* (2006.01)

(52) U.S. Cl.

CPC ..... *G03G 15/0889* (2013.01); *G03G 15/0863* (2013.01); *G03G 15/0867* (2013.01); *G03G 15/087* (2013.01); *G03G 15/0891* (2013.01); *G03G 15/55* (2013.01); *G03G 15/80* (2013.01); *G03G 21/1652* (2013.01);

(Continued)

(58) Field of Classification Search

CPC .......... G03G 15/0889; G03G 15/0891; G03G 2215/0827; G03G 15/0863; G03G 15/55; G03G 15/0867; G03G 15/087; G03G 15/80; G03G 21/1652; G03G 21/1867; G03G 2221/166; G03G 2215/0663;

(Continued)

(56) References Cited

U.S. PATENT DOCUMENTS 11,803,142 B1 * 10/2023 Shinohara .......... G03G 15/2053
2012/0056921 A1 * 3/2012 Nakano .................. B41J 2/1752
347/1

(Continued)

FOREIGN PATENT DOCUMENTS

| | | |
|---|---|---|
| JP | 2012-226289 | 11/2012 |
| JP | 2018-063323 | 4/2018 |
| JP | 2020-008596 | 1/2020 |

*Primary Examiner* — Arlene Heredia
*Assistant Examiner* — Laura Roth
(74) *Attorney, Agent, or Firm* — XSENSUS LLP

(57) ABSTRACT

An image forming apparatus includes an apparatus body, a developer container, a data recording medium, a contact terminal, a detector, and control circuitry. The developer container is detachably attached in the apparatus body. The data recording medium is on the developer container. The contact terminal is disposed in the apparatus body and contacts the data recording medium. The detector detects a communication failure between the data recording medium and the apparatus body. The control circuitry executes a control mode to vibrate the data recording medium when the detector detects the communication failure.

14 Claims, 7 Drawing Sheets

(52) U.S. Cl.
CPC ............... *G03G 2215/0668* (2013.01); *G03G 2215/0697* (2013.01); *G03G 2215/0827* (2013.01)

(58) Field of Classification Search
CPC ... G03G 2215/0668; G03G 2215/0678; G03G 2215/0697
See application file for complete search history.

(56) References Cited

U.S. PATENT DOCUMENTS

| | | | | |
|---|---|---|---|---|
| 2012/0207507 | A1* | 8/2012 | Okamoto ............... | H01R 39/64 439/13 |
| 2013/0321853 | A1* | 12/2013 | Lee ...................... | H04N 1/4433 358/1.14 |
| 2015/0062223 | A1 | 3/2015 | Takeuchi et al. | |
| 2016/0004184 | A1* | 1/2016 | Kikuchi ............... | G03G 15/087 399/258 |
| 2019/0094782 | A1* | 3/2019 | Sato ................... | G03G 21/1878 |

* cited by examiner

IMAGE FORMING APPARATUS HAVING A CONTROL MODE TO VIBRATE A DATA RECORDING MEDIUM

CROSS-REFERENCE TO RELATED APPLICATION

This patent application is based on and claims priority pursuant to 35 U.S.C. § 119(a) to Japanese Patent Application No. 2021-186872, filed on Nov. 17, 2021, in the Japan Patent Office, the entire disclosure of which is hereby incorporated by reference herein.

BACKGROUND

Technical Field

Embodiments of the present disclosure relate to an image forming apparatus such as a copying machine, a printer, a facsimile machine, or a multifunction peripheral thereof.

Related Art

Some technologies have been proposed by which a developer container such as a toner bottle is detachably (replaceably) attached to an image forming apparatus such as a copying machine. Specifically, a data recording medium such as an identification (ID) chip in which data on the developer container is stored is disposed in such a developer container. When the developer container is attached to an apparatus body of the image forming apparatus, the data recording medium of the developer container and a contact terminal of the apparatus body of the image forming apparatus contact to be able to communicate with each other. Thus, the data can be exchanged between the developer container (or the data recording medium) and the apparatus body of the image forming apparatus.

SUMMARY

In an aspect of the present disclosure, there is provided an image forming apparatus that includes an apparatus body, a developer container, a data recording medium, a contact terminal, a detector, and control circuitry. The developer container is detachably attached in the apparatus body. The data recording medium is on the developer container. The contact terminal is disposed in the apparatus body and contacts the data recording medium. The detector detects a communication failure between the data recording medium and the apparatus body. The control circuitry executes a control mode to vibrate the data recording medium when the detector detects the communication failure.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
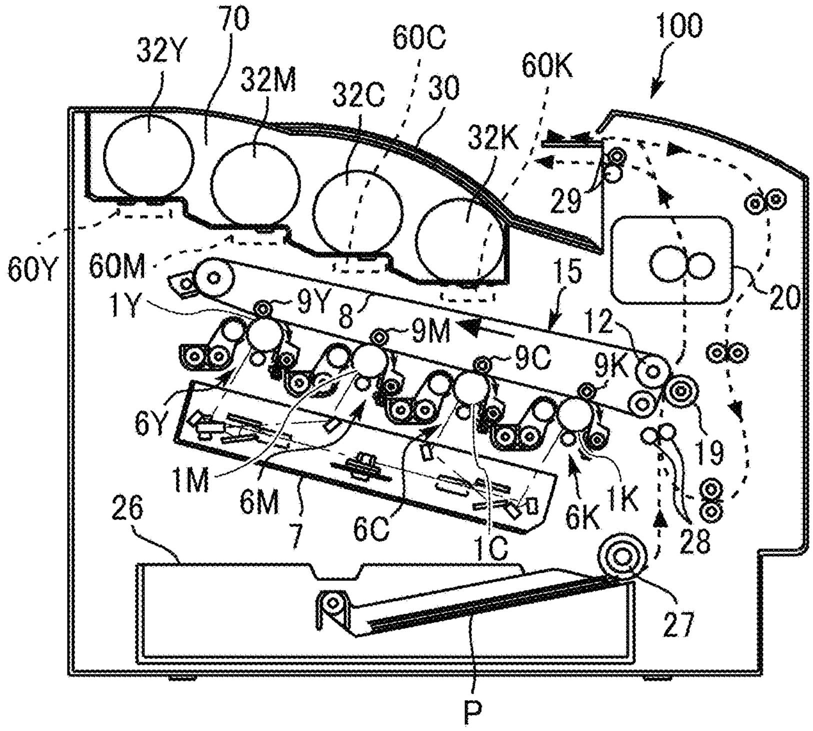
FIG. 1 is a schematic diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, an overall configuration and operation of an image forming apparatus 100 are described. As illustrated in FIG. 1 (and FIG. 3), four toner containers 32Y, 32M, 32C, and 32K serving as developer containers corresponding to respective colors of yellow, magenta, cyan, and black are detachably (or replaceably) attached in a toner container mount 70 located in an upper area of an apparatus body of the image forming apparatus 100. An intermediate transfer unit 15 is disposed below the toner container mount 70. Image forming devices 6Y, 6M, 6C, and 6K corresponding to colors of yellow, magenta, cyan, and black, respectively, are arranged side by side to face an intermediate transfer belt 8 of the intermediate transfer unit 15. Toner supply devices 60Y, 60M, 60C, and 60K are disposed below the toner containers 32Y, 32M, 32C, and 32K (serving as developer containers), respectively. Toners stored in the toner containers 32Y, 32M, 32C, and 32K (serving as storage containers) are supplied to developing devices of the image forming devices 6Y, 6M, 6C, and 6K by the toner supply devices 60Y, 60M, 60C, and 60K, respectively.

Figure 2:
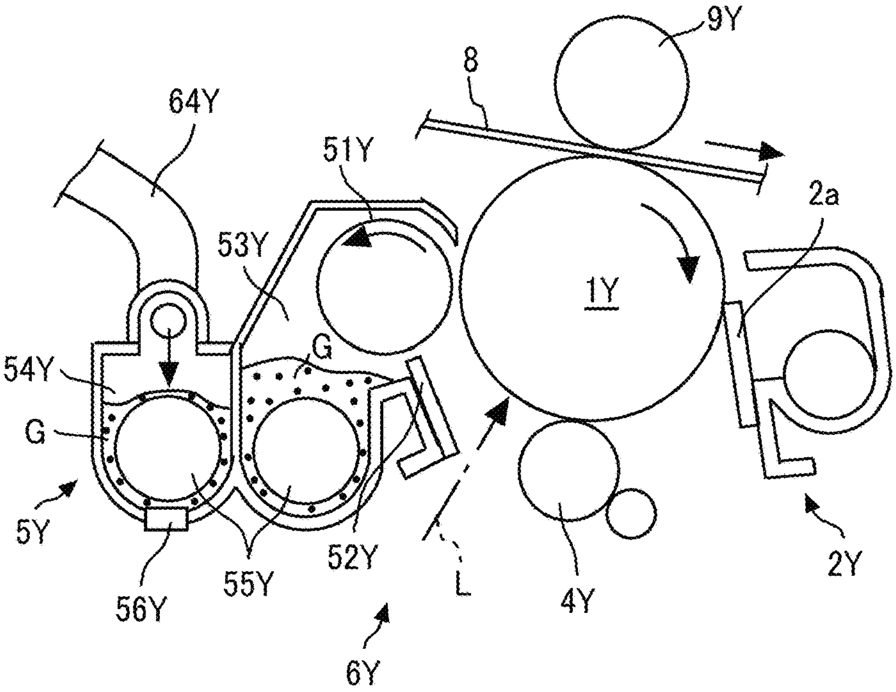
FIG. 2 is a cross-sectional view of an image forming device of the image forming apparatus in FIG. 1.

With reference to FIG. 2, the image forming device 6Y corresponding to yellow includes, for example, a photoconductor drum 1Y (serving as an image bearer), and a charging device 4Y, a developing device 5Y, a cleaning device 2Y, and a charge eliminating device, which are disposed around the photoconductor drum 1Y. Image forming processes (i.e., charging process, exposure process, development process, transfer process, cleaning process, and charge eliminating process) are executed on the photoconductor drum 1Y. Thus, a yellow toner image is formed on the surface of the photoconductor drum 1Y.

The other three image forming devices 6M, 6C, and 6K have substantially similar configuration to that of the image forming device 6Y for yellow except for the color of toner used therein and form magenta, cyan, and black toner images, respectively. Only the image forming device 6Y for yellow is described below and descriptions of the other three image forming devices 6M, 6C, and 6K are omitted to avoid redundancy.

As illustrated in FIG. 2, the photoconductor drum 1Y is driven to rotate clockwise in FIG. 2 by a motor. The charging device 4Y uniformly charges the surface of the photoconductor drum 1Y (a charging process). When the surface of the photoconductor drum 1Y reaches a position at which the surface of the photoconductor drum 1Y is irradiated with a laser beam L emitted from an exposure device 7 (see FIG. 1), the photoconductor drum 1Y is scanned with the laser beam L at the position. Thus, an electrostatic latent image corresponding to yellow is formed on the photoconductor drum 1Y (an exposure process).

When the surface of the photoconductor drum 1Y reaches a position facing the developing device 5Y, at the position, the electrostatic latent image is developed with the toner into a yellow toner image (a development process). When the surface of the photoconductor drum 1Y bearing the toner image reaches a position facing a primary transfer roller 9Y via the intermediate transfer belt 8, at the position, the toner image on the photoconductor drum 1Y is transferred onto the intermediate transfer belt 8 (a primary transfer process). After the primary transfer process, a slight amount of untransferred toner remains on the photoconductor drum 1Y.

When the surface of the photoconductor drum 1Y reaches a position opposite the cleaning device 2Y, at the position, a cleaning blade 2*a* of the cleaning device 2Y mechanically collects the untransferred toner on the photoconductor drum 1Y (a cleaning process). The surface of the photoconductor drum 1Y reaches a position opposite the charge eliminating device. At the position, residual potential is removed from the surface of the photoconductor drum 1Y. Thus, a series of image forming processes executed on the surface of the photoconductor drum 1Y is completed.

Note that the other image forming devices 6M, 6C, and 6K execute the series of image forming processes described above in substantially the same manner as the image forming device 6Y. That is, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Then, the toner images formed on the photoconductor drums 1M, 1C, and 1K through the development process are transferred and superimposed on the intermediate transfer belt 8. Thus, a color toner image is formed on the intermediate transfer belt 8.

With reference to FIG. 1, the intermediate transfer unit 15 includes, for example, the intermediate transfer belt 8, the four primary transfer rollers 9Y, 9M, 9C, and 9K, a secondary-transfer counter roller 12, multiple tension rollers, and an intermediate-transfer-belt cleaner. The intermediate transfer belt 8 is stretched around and supported by the multiple rollers and is rotated in the direction indicated by an arrow illustrated in FIG. 1 as a roller (i.e., the secondary-transfer counter roller 12) serving as a drive roller rotates.

Each of the four primary transfer rollers 9Y, 9M, 9C, and 9K nips the intermediate transfer belt 8 with the corresponding one of the photoconductor drums 1Y, 1M, 1C, and 1K to form an area of contact, herein called a primary transfer nip, between the intermediate transfer belt 8 and the corresponding one of the photoconductor drums 1Y, 1M, 1C, and 1K. A primary-transfer bias opposite in polarity to the toner is applied to the primary transfer rollers 9Y, 9M, 9C, and 9K. The intermediate transfer belt 8 travels in the direction indicated by the arrow (counterclockwise) in FIG. 1 and sequentially passes through the primary transfer nips of the primary transfer rollers 9Y, 9M, 9C, and 9K. As a result, the single-color toner images on the photoconductor drums 1Y, 1M, 1C, and 1K, having the respective colors, are primarily transferred to and superimposed onto the intermediate transfer belt 8, thereby forming the multicolor toner image (a primary transfer process).

Subsequently, the intermediate transfer belt 8 that the toner images of the respective colors are transferred to and superimposed onto reaches a position opposite a secondary transfer roller 19. At the position, the intermediate transfer belt 8 is nipped between the secondary-transfer counter roller 12 and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At that time, the untransferred toner that has not transferred onto the sheet P remains on the surface of the intermediate transfer belt 8. The surface of the intermediate transfer belt 8 then reaches a position opposite the intermediate-transfer-belt cleaner. At the position, the intermediate-transfer-belt cleaner collects the untransferred toner from the surface of the intermediate transfer belt 8. As a result, a series of transfer processes executed on the outer circumferential surface of the intermediate transfer belt 8 is completed.

The sheet P is conveyed from a sheet feeder 26 disposed in a lower portion of the apparatus body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P of the stack of multiple sheets P in the sheet feeder 26 toward a roller nip between the registration roller pair 28.

As the registration roller pair 28 stops rotating temporarily, the leading end of the sheet P stops moving at the roller nip of the registration roller pair 28. Rotation of the registration roller pair 28 is timed to convey the sheet P toward the secondary transfer nip such that the sheet P meets the color toner image on the intermediate transfer belt 8 at the secondary transfer nip. Thus, the desired color toner image is transferred onto the sheet P.

Subsequently, the sheet P, onto which the color toner image is transferred at the secondary transfer nip, is conveyed to a position of a fixing device 20. Then, at the position, the color toner image transferred to the surface of the sheet P is fixed on the sheet P by heat and pressure of a fixing roller and a pressure roller. Thereafter, the sheet P is conveyed through the rollers of an output roller pair 29 and ejected to the outside of the image forming apparatus 100. The sheets P ejected by the output roller pair 29 to the outside of the image forming apparatus 100 are sequentially stacked as output images on a stack tray 30. Thus, a series of image forming processes (printing operation) in the image forming apparatus is completed.

Next, a detailed description is provided of a configuration and operation of the developing device 5Y of the image forming device 6Y with reference to FIG. 2. The developing device 5Y includes a developing roller 51Y disposed opposite the photoconductor drum 1Y, a doctor blade 52Y disposed opposite the developing roller 51Y, two conveying screws 55Y disposed in developer housings 53Y and 54Y, and a toner concentration sensor 56Y to detect concentration of toner in a developer G. The developing roller 51Y includes a magnet and a sleeve. The magnet is secured inside the developing roller 51Y. The sleeve rotates around the magnet. The developer housings 53Y and 54Y contain the two-component developer G including carrier and toner. The developer housing 54Y communicates, via an opening on an upper side thereof, with a toner conveying tube 64Y (i.e., serving as a toner conveyance passage).

The developing device 5Y described above operates as follows. The sleeve of the developing roller 51Y rotates in a direction indicated by an arrow in FIG. 2. The developer G is carried on the developing roller 51Y by a magnetic field generated by the magnet. As the sleeve rotates, the developer G moves along the outer circumferential surface of the developing roller 51Y.

The developer G in the developing device 5Y is adjusted so that the ratio of toner (toner concentration) in the developer G is within a specified range. Specifically, the toner supply device 60Y (see FIGS. 3 and 5) supplies toner (as developer) from the toner container 32Y (developer container) to the developer housing 54Y according to the toner consumption in the developing device 5Y. The configuration and operation of the toner supply device 60Y are described in detail later.

The two conveying screws 55Y mix and stir the developer G with the toner supplied to the developer housing 54Y while circulating with the developer G in the two developer housings 53Y and 54Y. In this case, the developer G moves in the direction perpendicular to the surface of the plane on which FIG. 2 is illustrated. The toner in the developer G is electrically charged by friction with the carrier and thus is attracted to the carrier. Both the toner and the carrier are borne on the developing roller 51Y due to a magnetic force generated on the developing roller 51Y.

The developer G borne on the developing roller 51Y is conveyed in the direction indicated by the arrow in FIG. 2 and reaches a position opposite the doctor blade 52Y. At the position, the doctor blade 52Y adjusts the amount of the developer G on the developing roller 51Y to an appropriate amount. Thereafter, the developer G on the developing roller 51Y is conveyed to a position opposite the photoconductor drum 1Y (i.e., a developing area). The toner is attracted to the electrostatic latent image formed on the photoconductor drum 1Y by an electric field generated in the developing area. As the sleeve rotates, the developer G remaining on the developing roller 51Y reaches an upper part of the developer housing 53Y and separates from the developing roller 51Y.

Figure 3:
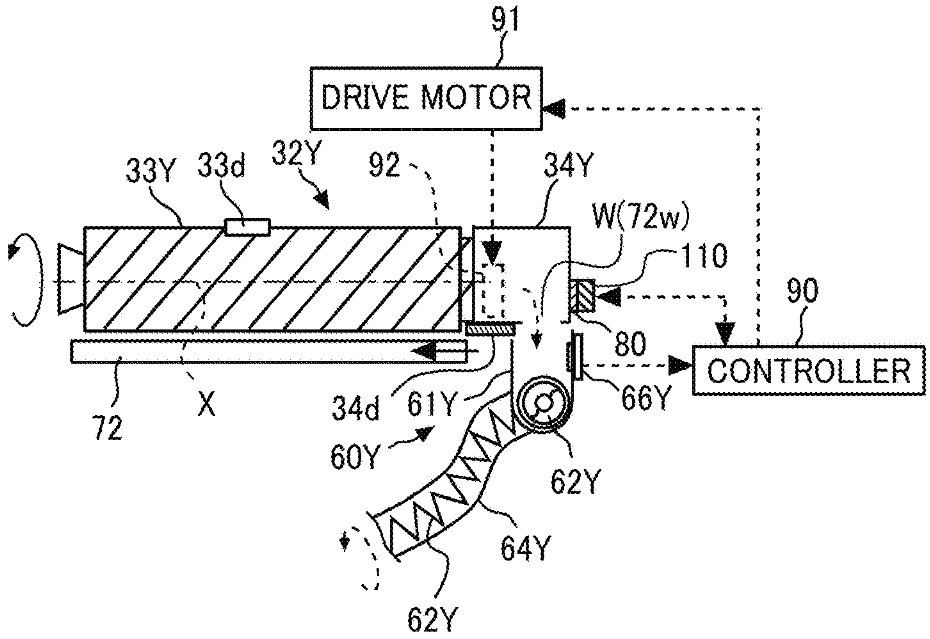
FIG. 3 is a diagram illustrating a state in which a toner container is attached on a toner supply device.

Next, with reference to FIGS. 3 to 5, the toner supply devices 60Y, 60M, 60C, and 60K are described in detail below. As illustrated in FIG. 3, the respective color toners in the toner containers 32Y, 32M, 32C, and 32K disposed in the toner container mount 70 in the apparatus body of the image forming apparatus 100 are supplied to the corresponding developing devices by the toner supply devices 60Y, 60M, 60C, and 60K provided for the respective color toners according to the amount of toner consumed in the corresponding developing devices. It is to be noted that the four toner supply devices 60Y, 60M, 60C, and 60K have a similar structure, and the four toner containers 32Y, 32M, 32C, and 32K have a similar structure except for the color of toner used in the image forming processes. Therefore, only the toner supply device 60Y and the toner container 32Y for yellow are described below as representatives, and descriptions of the toner supply devices 60M, 60C, and 60K and the toner containers 32M, 32C, and 32K for the other three colors are omitted to avoid redundancy.

Figure 4:
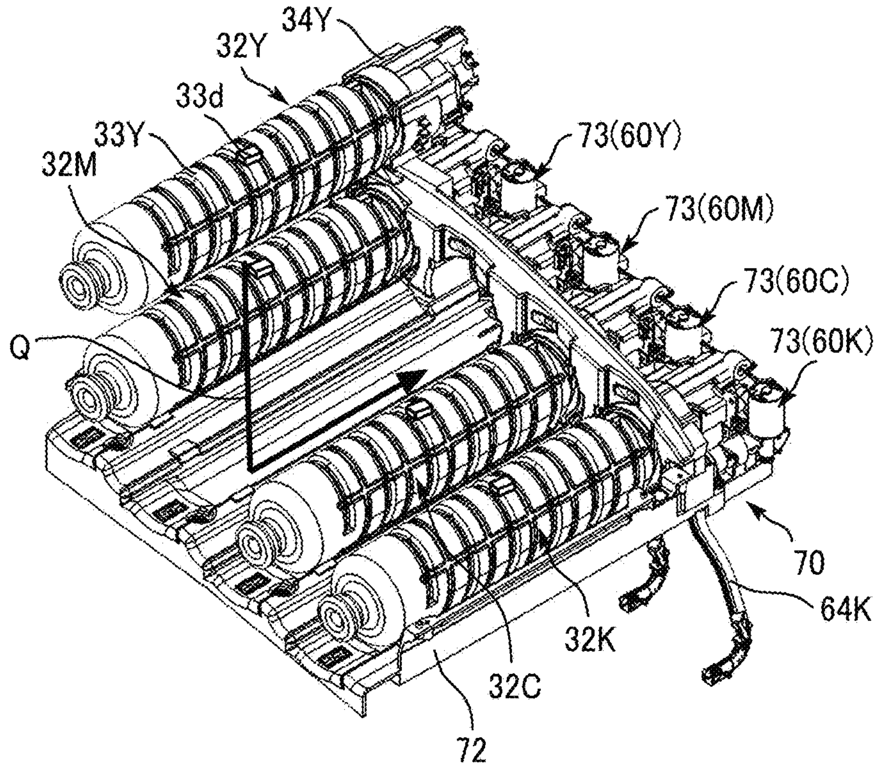
FIG. 4 is a perspective view of a toner container mount onto which the toner container is attached.

As illustrated in FIG. 4, when the toner containers 32Y, 32M, 32C, and 32K are attached to the toner container mount 70 in the apparatus body of the image forming apparatus 100 (i.e., a movement along the direction indicated by an arrow Q in FIG. 4), shutters 34*d* (see FIG. 3) of the toner containers 32Y, 32M, 32C, and 32K are moved in conjunction with the installation of the toner containers 32Y, 32M, 32C, and 32K and toner discharge ports W of the toner containers 32Y, 32M, 32C, and 32K are opened. Consequently, the toner discharge ports W of the toner containers 32Y, 32M, 32C, and 32K communicate with toner supply inlets 72*w* (see FIG. 3) of the toner container mount 70 (i.e., toner supply devices 60Y, 60M, 60C, and 60K). Accordingly, the toner contained in the toner containers 32Y, 32M, 32C, and 32K is discharged from the toner discharge ports W, passes through the toner supply inlets 72*w* of the toner container mount 70 (i.e., toner supply devices 60Y, 60M, 60C, and 60K), and then, is stored in a storage portion 61Y of the toner supply device 60Y. With reference to FIGS. 3, 6, 7A and 7B, when the toner container 32Y is attached to the apparatus body of the image forming apparatus 100, an identification (ID) chip 80 serving as a data recording medium installed on a cap 34Y of the toner container 32Y is connected to a main-body terminal unit 110 (see FIG. 7A) of the apparatus body of the image forming apparatus 100 in conjunction with the attaching operation. Thus, the data can be exchanged between the ID chip 80 and a controller 90 of the apparatus body of the image forming apparatus 100. Based on the data acquired from the ID chip 80, the controller 90 displays the amount of toner remaining in the toner container 32Y (remaining amount of the toner) on an operation-display panel (which is disposed on an exterior of the apparatus body of the image forming apparatus 100), determines the timing of toner supply from the toner container 32Y to the developing device 5Y, and executes a recovery operation from a toner end state. When the toner container 32Y is detached (is taken out) from the apparatus body of the image forming apparatus 100, the connection between the ID chip 80 and the main-body terminal unit 110 is released in conjunction with the detaching operation.

Figure 5:
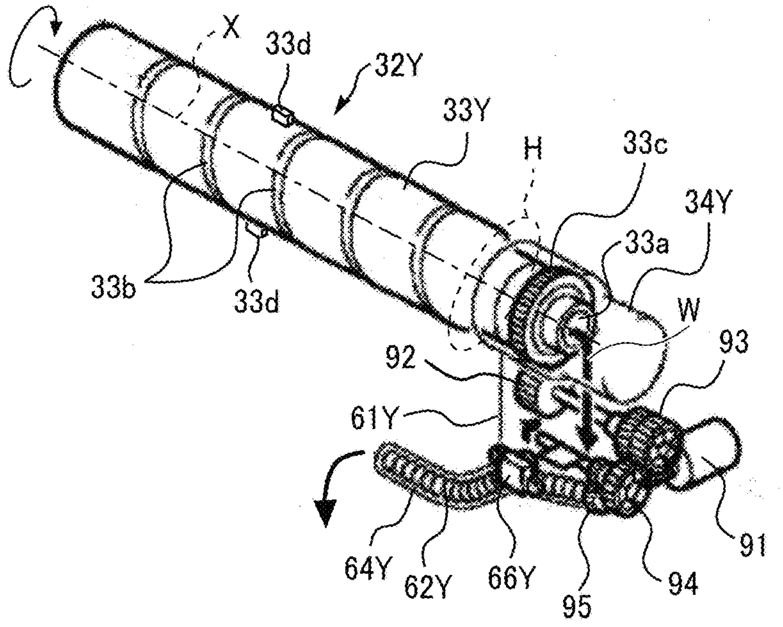
FIG. 5 is a perspective view of a main part of the toner container and the toner supply device.

With reference to FIGS. 3 to 5, the toner container 32Y as a developer container is a substantially cylindrical toner bottle, and mainly includes the cap 34Y which is non-rotatably held by the toner container mount 70 and a container body 33Y (bottle body) in which a gear 33*c* is integrally formed. The container body 33Y is held to be rotatable relative to the cap 34Y and is rotationally driven by a drive mechanism (including, e.g., a drive motor 91, and gears 92 and 93) in a direction indicated by an arrow in FIGS. 3 and 5. When the container body 33Y itself rotates around a rotation axis X, the toner contained in the toner container 32Y (container body 33Y) is conveyed in the rotation axis direction (longitudinal direction) (i.e., the conveyance from left to right in FIG. 3) by a projection 33*b* (see FIG. 5) spirally formed on the inner circumferential surface (inner wall surface) of the container body 33Y. The toner is discharged from an opening portion 33*a* serving as a discharge port of the container body 33Y to the cap 34Y and is further discharged from the toner discharge port W of the cap 34Y to outside the container. That is, the container body

33Y of the toner container 32Y is appropriately driven to rotate by the drive motor 91. Thus, the toner is appropriately supplied to the storage portion 61Y. Note that the toner containers 32Y, 32M, 32C, and 32K are replaced with new ones when the respective service lives thereof have expired, that is, when almost all toner contained in the respective toner containers 32 has been depleted.

Figure 6:
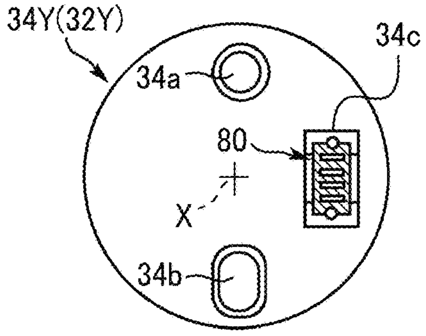
FIG. 6 is a front view of a cap of the toner container.

As illustrated in FIG. 6, the ID chip 80 as data recording medium is fitted (disposed) in an installation portion 34*c* formed on an end face of the cap 34Y. That is, the ID chip 80 (serving as data recording medium) exchanges various kinds of data with the controller 90 in the apparatus body of the image forming apparatus 100. Specifically, the ID chip 80 stores, in advance, data of the toner stored in the toner container 32Y such as a manufacturing date, a manufacturing lot number, a color, and a type, and data of the toner container 32Y such as a manufacturing date, a destination, a manufacturing factory, and presence or absence of recycling. Such data are transmitted to the controller 90 (of the apparatus body of the image forming apparatus 100). Further, data such as a use history in the image forming apparatus 100 is transmitted from the controller 90 (of the apparatus body) to the ID chip 80 (serving as data recording medium), and the data is appropriately stored.

As illustrated in FIG. 6, positioning holes 34*a* and 34*b* for positioning the cap 34Y in the toner container mount 70 (of the apparatus body of the image forming apparatus 100) are formed in the end face of the cap 34Y. When the toner container 32Y is attached to the apparatus body of the image forming apparatus 100, the positioning holes 34*a* and 34*b* formed in the cap 34Y of the toner container 32Y are fitted to positioning pins 120 and 121 (see FIG. 7A) of the apparatus body of the image forming apparatus 100 in conjunction with the attaching operation. As a result, the position of the cap 34Y in the toner container mount 70 (of the apparatus body of the image forming apparatus 100) is determined. In the cap 34Y thus positioned, the ID chip 80 is communicably connected to the main-body terminal unit 110 (see FIG. 7A) of the apparatus body of the image forming apparatus 100.

Figure 7A:
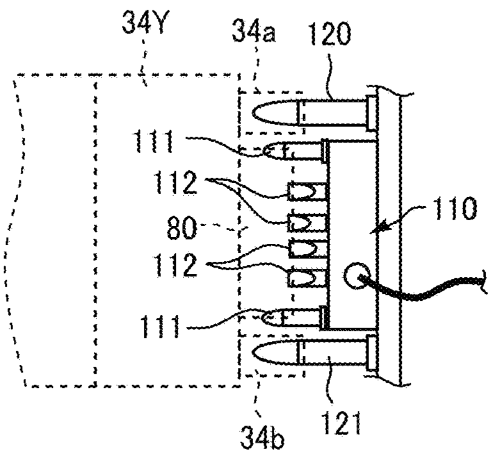
FIG. 7A is a side view of a main-body terminal unit of an apparatus body of the image forming apparatus.
Figure 7B:
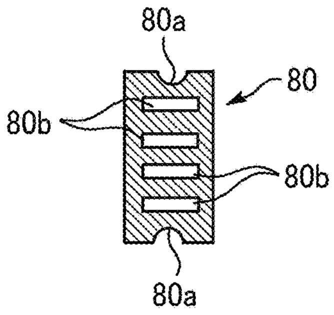
FIG. 7B is a plan view of an ID chip of the toner container.

In the present embodiment, as illustrated in FIG. 7B, four chip-side terminals 80*b* are arranged side by side in the vertical direction on the ID chip 80 as data recording medium of the toner container 32Y. A notch 80*a* is formed at each of upper and lower ends of the ID chip 80. In the present embodiment, clock-signal terminals, ground terminals, serial-data terminals, and power-supply terminals are used as the four chip-side terminals 80*b*. The ID chip 80 is formed in a substantially flat-plate shape. On the other hand, as illustrated in FIG. 7A, four contact terminals 112 are arranged side by side in the main-body terminal unit 110 of the apparatus body of the image forming apparatus 100 to be in conductive contact with the four chip-side terminals 80*b* of the ID chip 80. Further, the main-body terminal unit 110 is provided with pins 111 to be fitted into the notches 80*a* of the ID chip 80. In the present embodiment, the contact terminals 112 are elastic plate-shaped members having a substantially L-shape in which a bending process is applied to portions to be brought into contact with the chip-side terminals 80*b* having a substantially flat-plate shape.

With reference to FIGS. 3 and 5, each of the toner supply devices 60Y, 60M, 60C, and 60K includes, for example, the toner container mount 70, the storage portion 61Y, a conveying coil 62Y, a toner detection sensor 66Y, the drive motor 91, and the gears 92 to 95. The storage portion 61Y is disposed below the toner discharge port W of the toner container 32Y and stores the toner discharged from the toner discharge port W of the toner container 32Y. A bottom portion of the storage portion 61Y is coupled to an upstream portion of the toner conveying tube 64Y. The toner detection sensor 66Y serving as a toner detector that detects that the toner (developer) stored in the storage portion 61Y has reached a specified amount (the storage portion 61Y is almost full) is disposed on a wall face of the storage portion 61Y (i.e., a position at a specified height from the bottom portion). For example, a piezoelectric sensor can be used as the toner detection sensor 66Y. When the toner detection sensor 66Y detects (toner end detection) that the amount of the toner stored in the storage portion 61Y has not reached a specified amount, the controller 90 causes the drive motor 91 to drive the container body 33Y of the toner container 32Y to rotate the container body 33Y for a specified time to supply the toner to the storage portion 61Y. In a case where the toner detection by the toner detection sensor 66Y is not released even if such control is repeated, the controller 90 determines that there is no toner in the toner container 32Y and displays a message prompting replacement of the toner container 32Y on a display panel disposed on the exterior of the apparatus body of the image forming apparatus 100.

As illustrated in FIGS. 3 and 5, the conveying coil 62Y is rotatably disposed inside the toner conveying tube 64Y and conveys the toner stored in the storage portion 61Y toward the developing device 5Y via the toner conveying tube 64Y. Specifically, the conveying coil 62Y is driven to rotate by the drive motor 91 to convey the toner along the toner conveying tube 64Y from the bottom portion (lowest point) of the storage portion 61Y toward the upper portion of the developing device 5Y. The toner conveyed by the conveying coil 62Y is supplied into the developing device 5Y (i.e., the developer housing 54Y). In the present embodiment, a driving source of the conveying coil 62Y is shared with the driving source of the toner container 32Y (container body 33Y). That is, when the drive motor 91 is driven to rotate, the toner container 32Y rotates and the conveying coil 62Y also rotates.

With reference to FIG. 4, the toner container mount 70 mainly includes a cap holder 73 for non-rotatably holding the cap 34Y of the toner container 32Y, a bottle holder 72 for rotatably holding the container body 33Y of the toner container 32Y, and the main-body terminal unit 110 (see FIGS. 3 and 7A). The main-body terminal unit 110 is provided with a plurality of contact terminals 112. With reference to FIG. 1, when an apparatus-body cover disposed on the upper portion of the apparatus body of the image forming apparatus 100 (i.e., which is on the front side in the direction perpendicular to the surface of the plane on which FIG. 1 is illustrated) is opened, the toner container mount 70 is exposed. The toner containers 32Y, 32M, 32C, and 32K are attached to and detached from the front upper side of the apparatus body of the image forming apparatus 100 with the rotation axis direction (longitudinal direction) of the toner containers 32Y, 32M, 32C, and 32K kept horizontal (i.e., an attachment and detachment operation in the longitudinal direction of the toner containers 32Y, 32M, 32C, and 32K as the attachment and detachment direction). Specifically, when the toner containers 32Y, 32M, 32C, and 32K are attached to the apparatus body of the image forming apparatus 100, the toner containers 32Y, 32M, 32C, and 32K are disposed on the toner container mount 70 from above the apparatus body of the image forming apparatus 100 with the apparatus-body cover open. Then, the toner containers 32Y, 32M, 32C, and 32K are pushed in the horizontal direction with the cap 34Y at the head (movement along the arrow Q in FIG. 4). By contrast, when the toner containers 32Y, 32M, 32C, and 32K are detached from the apparatus body of the image forming apparatus 100, an operation reverse to the attaching operation is executed.

A configuration and operation of the image forming apparatus 100 according to the present embodiment is described in detail. As described above with reference to FIGS. 5, 6, 7A and 7B, the ID chip 80 serving as a data recording medium is disposed on the toner container 32Y serving as a developer container detachably attached to the apparatus body of the image forming apparatus 100. The toner container 32Y is provided with the container body 33Y (the spiral projection 33*b* is formed on an inner circumferential surface of the container body 33Y) that can discharge the toner as a developer from the opening portion 33*a* as a discharge port by rotating around the rotation axis X and the non-rotating cap 34Y covering a head portion formed with the opening portion 33*a* (serving as a discharge port) in the container body 33Y. The apparatus body of the image forming apparatus 100 is provided with the contact terminals 112 (of the main-body terminal unit 110) which are communicably brought into contact with the ID chip 80 (data recording medium) of the toner container 32Y (serving as a developer container) attached in the apparatus body of the image forming apparatus 100.

The image forming apparatus 100 according to the present embodiment is provided with a detector that detects a communication failure between the ID chip 80 (serving as a data recording medium) and the apparatus body of the image forming apparatus 100 (or the controller 90). Specifically, when communication from the ID chip 80 via the contact terminals 112 (main-body terminal unit 110) cannot be confirmed, the controller 90 determines that the communication failure with the ID chip 80 has occurred. That is, the controller 90 also functions as a detector that detects the communication failure.

In the present embodiment, when the controller 90 serving as a detector detects a communication failure with the ID chip 80, a control mode in which vibration is applied to the ID chip 80 (data recording medium) is executed. Such a control mode is hereinafter referred to as a "vibration mode" as appropriate. Specifically, in the present embodiment, when the toner container 32Y (developer container) is attached to the apparatus body of the image forming apparatus 100 at the time of replacement of the toner container 32Y, the controller 90 (detector) detects whether the communication failure has occurred. The reason why the controller 90 detects whether the communication failure occurs at such a timing is that the data is exchanged between the controller 90 and the ID chip 80 when the toner container 32Y is attached. When a normal printing operation is started after the attachment of the toner container 32Y, vibration is applied to the ID chip 80 as described later with the rotational drive of the toner container 32Y (container body 33Y) at the time of toner supply. Thus, the communication failure due to a contact failure between the ID chip 80 and the contact terminals 112 is less likely to occur.

The "vibration mode" is a control mode that drives the toner container 32Y. Specifically, the "vibration mode" is a control mode that drives the container body 33Y to rotate the container body 33Y. The cap 34Y on which the ID chip 80 is disposed is held in a non-rotatable manner in the toner container mount 70 (see FIG. 4). When the container body 33Y is driven to rotate by the drive motor 91, the cap 34Y vibrates due to the rotational drive. When the cap 34Y vibrates, the ID chip 80 also vibrates. That is, the drive motor 91 (see FIG. 3) that drives the container body 33Y to rotate functions as a vibration applier for applying vibration to the ID chip 80.

The vibration of the ID chip 80 reduces the communication failure due to the contact failure between the ID chip 80 and the contact terminals 112. Specifically, the ID chip 80 on the toner container 32Y contacts the contact terminals 112 of the apparatus body of the image forming apparatus 100 in conjunction with the attaching operation of the toner container 32Y to the apparatus body of the image forming apparatus 100. In a case where a user (operator) does not attach the toner container 32Y straight, a contact failure that the ID chip 80 does not normally contact the contact terminals 112 may occur. Also in a case where foreign substances (including, for example, dirt, or a film) is trapped in a contact portion between the ID chip 80 and the contact terminals 112, the contact failure between the ID chip 80 and the contact terminals 112 may occur. When such a contact failure has occurred, the communication failure occurs between the ID chip 80 and the controller 90. Thus, a failure that the controller 90 cannot perform various controls based on the data stored in the ID chip 80 may occur. In contrast, in the present embodiment, when the controller 90 (serving as a detector) detects the communication failure with the ID chip 80, the controller 90 causes the drive motor 91 to drive the container body 33Y to rotate for a specified period of time to vibrate the ID chip 80 separately from a normal toner supply operation. For this reason, a contact state of the ID chip 80 with respect to the contact terminals 112 is slightly changed. Thus, the contact state turns to be normal, and the communication failure is easily eliminated. That is, the communication failure between the toner container 32Y (ID chip 80) and the apparatus body of the image forming apparatus 100 (controller 90) is less likely to occur. In the present embodiment, the number of rotations per unit time of the container body 33Y in the vibration mode is set to be substantially same as that in the normal toner supply operation. The number of rotations per unit time may be set to be higher than that in the normal toner supply operation. In this case, since the vibration applied to the ID chip 80 in the vibration mode is increased, the above-described effect of reducing the communication failure is more easily achieved.

With reference to FIGS. 3 to 5, a protruding portion 33*d* (i.e., a protruding portion that protrudes in a direction away from the rotation axis X) is formed on a part of the outer circumferential surface of the container body 33Y of the toner container 32Y in the present embodiment. By providing the protruding portion 33*d* on the container body 33Y in this manner, the drive motor 91 drives the container body 33Y to rotate in the vibration mode (control mode) to vibrate the container body 33Y up and down in conjunction with the operation that the protruding portion 33*d* rides on the bottle holder 72 (see FIGS. 3 and 4). Thus, the degree of vibration of the ID chip 80 becomes accordingly larger. For this reason, the contact failure between the ID chip 80 and the contact terminals 112 is more easily eliminated. In the present embodiment, the two protruding portions 33*d* are disposed at a part in the longitudinal direction of the container body 33Y at equal intervals in the rotation direction. The position and the number of the protruding portions 33*d* are not limited thereto. The vibration of the container body 33Y by the protruding portions 33*d* occurs also in a normal toner supply operation. The aggregation of the toner in the container body 33Y at the time of the toner supplying operation is reduced due to the vibration of the container body 33Y.

With reference to FIG. 5, in the present embodiment, the container body 33Y is supported by the cap 34Y (which is non-rotatably held by the toner container mount 70) at a position H away from the head portion where the opening portion 33*a* is formed toward the bottom portion (left side in FIG. 3). The ID chip 80 (data recording medium) is disposed on the end face (the right end face in FIG. 3) of a projecting end of the cap 34Y to face the cap holder 73 of the toner container mount 70. That is, the ID chip 80 is disposed at a position sufficiently away from the support position H of the container body 33Y in the cap 34Y. With such a configuration, the vibration transmitted from the container body 33Y to the ID chip 80 in the vibration mode can be reinforced as compared with the case where the ID chip 80 is disposed in the vicinity of the support position H of the container body 33Y. As a result, the contact failure between the ID chip 80 and the contact terminals 112 is more easily eliminated.

With reference to FIG. 6, in the present embodiment, the ID chip 80 (data recording medium) is disposed in a non-rotating manner at a position away from the rotation axis X (which is the rotation center of the container body 33Y). That is, the ID chip 80 is disposed at a position sufficiently away from the rotation axis X in the cap 34Y. With such a configuration, the vibration transmitted from the container body 33Y to the ID chip 80 in the vibration mode can be reinforced as compared with the case where the ID chip 80 is disposed in the vicinity of the rotation axis X of the container body 33Y. As a result, the contact failure between the ID chip 80 and the contact terminals 112 is more easily eliminated.

Here, the "vibration mode" is a control mode in which the toner container 32Y (container body 33Y) is driven so that the toner (developer) inside the toner container 32Y (developer container) is conveyed toward the opening portion 33*a* (discharge port). Accordingly, when the vibration mode is executed for a specified period of time, the toner is discharged from the toner container 32Y for the specified period of time. Thus, the discharged toner is stored in the storage portion 61Y (see FIG. 3). On the other hand, in the present embodiment, when the controller 90 (serving as a detector) detects the communication failure again immediately after the controller 90 has executed the vibration mode (control mode), the controller 90 executes the vibration mode (control mode) again. That is, when the communication failure is not eliminated even if the controller 90 executes the vibration mode, the controller 90 executes the vibration mode again. However, in order to avoid infinite repetition of the vibration mode (control mode), the controller 90 does not re-execute the vibration mode exceeding a specified number of times. Specifically, in the present embodiment, the upper limit of the number N of times that the vibration mode is continuously executed is set to three. By executing the control as described above, the communication failure between the ID chip 80 and the controller 90 is efficiently reduced without taking too much time wastefully.

In the present embodiment, the container body 33Y is driven to rotate in a forward direction in the vibration mode as in the normal toner supply operation. On the other hand, the container body 33Y may be driven to rotate in the opposite direction in the vibration mode unlike in the normal toner supply operation. That is, the vibration mode may be a control mode in which the toner container 32Y is driven so that the toner (developer) in the toner container 32Y (developer container) is conveyed in a direction away from the opening portion 33*a* (discharge port). In this case, a forward-reverse rotation type motor is used as the drive motor 91. When the container body 33Y is rotated in reverse in the vibration mode, the toner is not positively discharged from the toner container 32Y. As a result, a problem that the storage portion 61Y (see FIG. 3) is overflowed with the toner by executing the vibration mode is less likely to occur.

Figure 8:
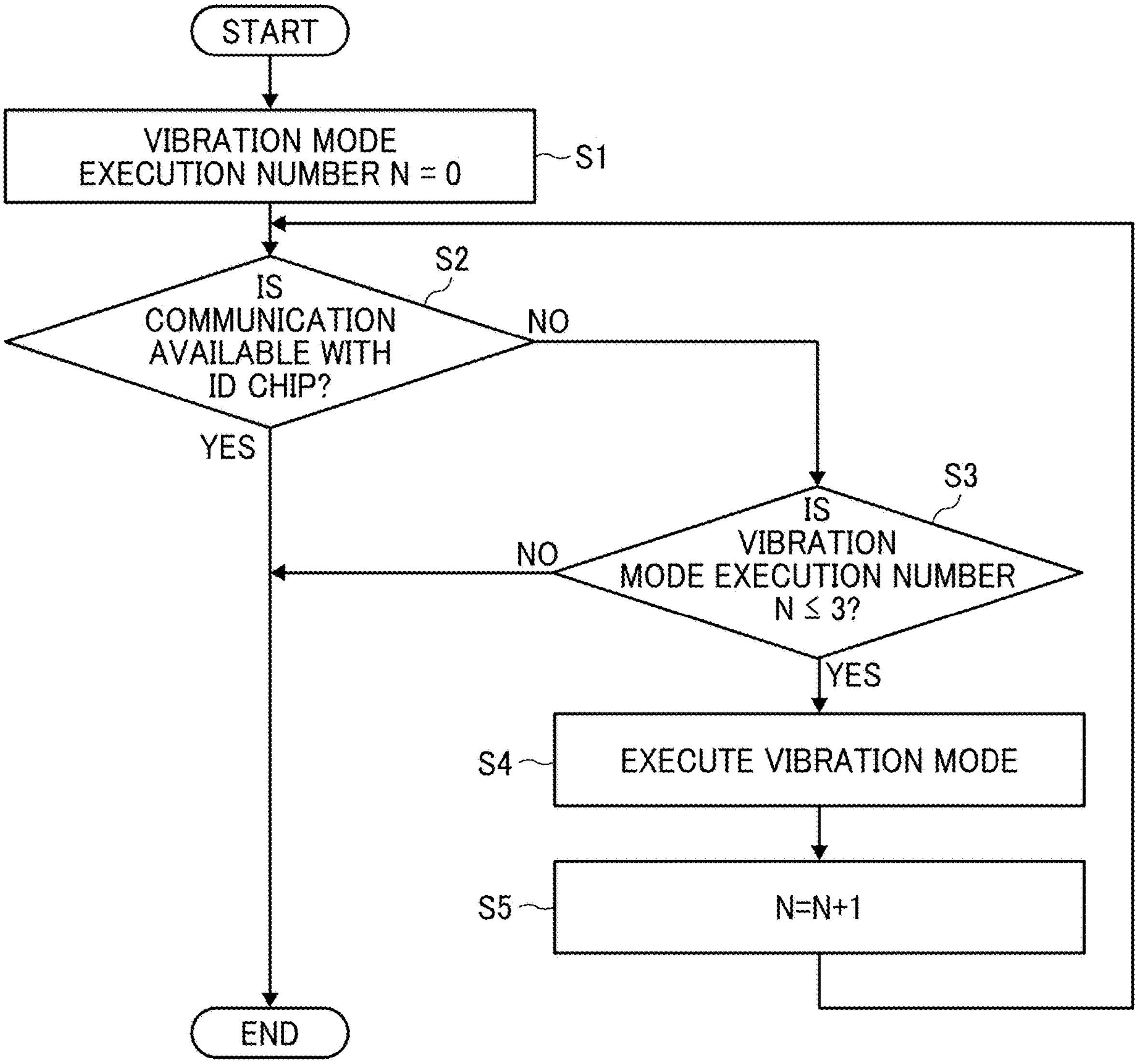
FIG. 8 is a flowchart illustrating an example of control when a vibration mode is executed.

An example of control when the vibration mode (control mode) is executed is described below with reference to FIG. 8. As illustrated in FIG. 8, first, when the toner container 32Y is set in the apparatus body of the image forming apparatus 100, the state is detected by a set detection sensor disposed in the toner container mount 70. Then, the number of times N of executions of the vibration mode is set to zero (in step S1 of FIG. 8). Thereafter, the controller 90 (serving as a detector) determines whether the communication with the ID chip 80 is available (in step S2 of FIG. 8). As a result, when the communication failure does not occur, the controller 90 determines that the communication is normal and ends this flow. In contrast, when the controller 90 determines that the communication failure has occurred in step S2, the controller 90 determines whether the number of times N of executions of the vibration mode is three or less (in step S3 of FIG. 8). As a result, when the number of times N of executions of the vibration mode exceeds three, the controller 90 ends this flow. In contrast, when the number of times N of executions of the vibration mode is three or less, the controller 90 executes the vibration mode (in step S4 of FIG. 8), increments the number of times N of executions by one (in step S5 of FIG. 8), and repeats the flow after step S2.

First Modification

Figure 9:
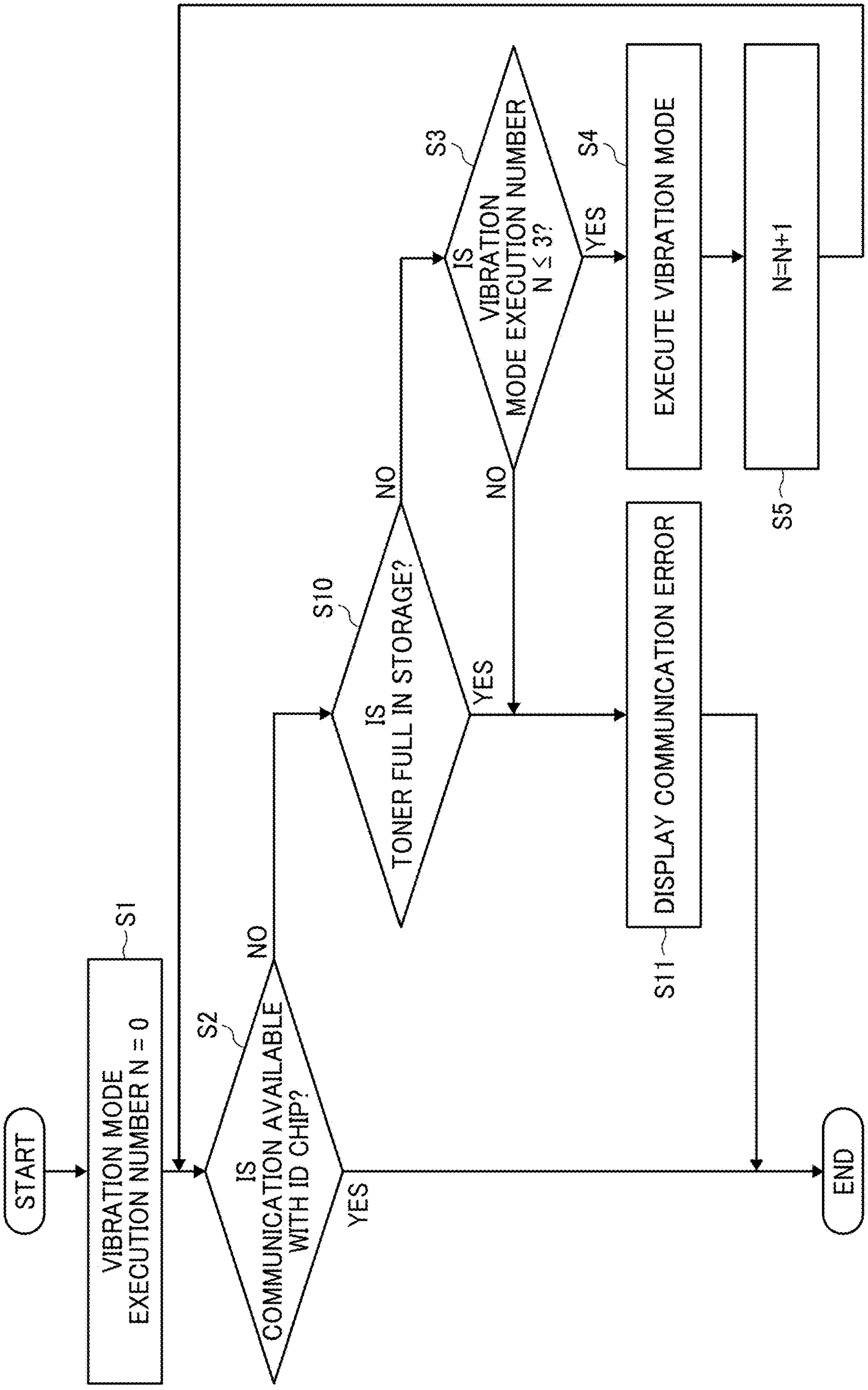
FIG. 9 is a flowchart of control when a vibration mode is executed according to a first modification.

The image forming apparatus 100 according to a first modification does not execute the vibration mode (control mode) when the toner detection sensor 66Y detects that the amount of toner (developer) stored in the storage portion 61Y has reached a specified amount. By performing such control, the container body 33Y is driven to rotate in the vibration mode to positively discharge the toner from the toner container 32Y. Thus, a problem that the storage portion 61Y (see FIG. 3) is overflowed with the toner is less likely to occur. Specifically, as illustrated in FIG. 9, in the vibration mode (control mode) in the first modification, the controller 90 (detector) determines whether the communication with the ID chip 80 is available in steps S1 to S2 of FIG. 9 similarly to the mode illustrated in FIG. 8. As a result, when the controller 90 determines that the communication failure has occurred in step S2, the controller 90 determines whether the storage portion 61Y is full of the toner (in step S10 of FIG. 9). Specifically, the controller 90 determines whether a state in which the toner stored in the storage portion 61Y has reached a specified amount is detected by the toner detection sensor 66Y. As a result, when the controller 90 determines that the storage portion 61Y is not full of the toner, the controller 90 determines whether the number of times N of executions of the vibration mode is three or less (in step S3 of FIG. 9). As a result, when the number of times N of executions of the vibration mode is three or less, the controller 90 executes the vibration mode (in step S4 of FIG. 9), increments the number of times N of executions by one (in step S5 of FIG. 9), and repeats the flow after step S2. In contrast, when the number of times N of executions of the vibration mode exceeds three in step S3 and when the controller 90 determines that the storage portion 61Y is full of the toner in step S10, the controller 90 causes the operation-display panel to display indicating that the communication failure has occurred (in step S11 of FIG. 9) and ends this flow. By performing such a warning display, the user can accurately grasp an abnormal state of the image forming apparatus 100. Also in the first modification, the communication failure between the toner container 32Y (ID chip 80) and the apparatus body of the image forming apparatus 100 (controller 90) can be prevented.

Second Modification

Figure 10:
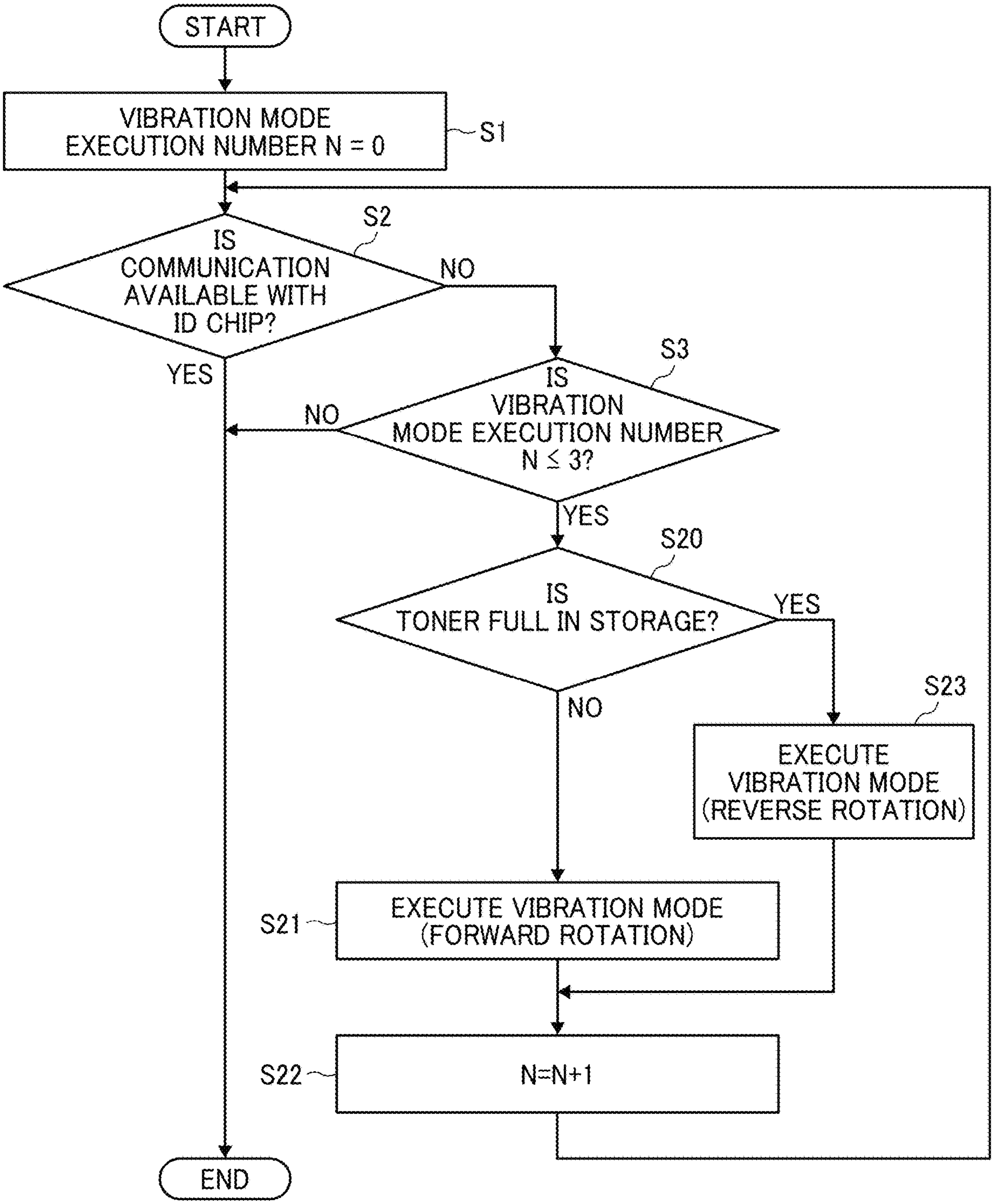
FIG. 10 is a flowchart of control when a vibration mode is executed according to a second modification.

The image forming apparatus 100 according to a second modification has a vibration mode as a control mode in which the toner container 32Y is driven such that the toner (developer) in the toner container 32Y (developer container) is conveyed in a direction toward the opening portion 33*a* (discharge port) or conveyed in a direction away from the opening portion 33*a* (discharge port). Specifically, when the controller 90 causes the toner detection sensor 66Y to detect that the amount of the toner (developer) stored in the storage portion 61Y has not reached a specified amount, the controller 90 executes the vibration mode in which the toner container 32Y is driven so that the toner is conveyed in a direction toward the opening portion 33*a*. That is, the controller 90 causes the drive motor 91 to drive the container body 33Y to rotate in the forward direction for a specified time. On the other hand, when the controller 90 causes the toner detection sensor 66Y to detect that the toner stored in the storage portion 61Y has reached a specified amount, the controller 90 executes the vibration mode in which the toner container 32Y is driven so that the toner is conveyed in a direction away from the opening portion 33*a*. That is, the controller 90 causes the drive motor 91 to drive the container body 33Y to rotate in the reverse direction for a specified time. By performing such control, the communication failure between the toner container 32Y (ID chip 80) and the apparatus body of the image forming apparatus 100 (controller 90) is less likely to occur, while preventing a problem that the toner overflows from the storage portion 61Y (see FIG. 3). Specifically, as illustrated in FIG. 10, in the vibration mode (control mode) in the second modification, the controller 90 (detector) determines whether the communication with the ID chip 80 is available in steps S1 to S2. When the communication is available, the controller 90 determines whether the number of times N of executions of the vibration mode is three or less (in step S3 of FIG. 10) similarly to the mode illustrated in FIG. 8. As a result, when the number of times of the executions of the vibration mode is three or less, the controller 90 determines whether the storage portion 61Y is full (in step S20 of FIG. 10). As a result, when the controller 90 determines that the storage portion 61Y is not full, the container body 33Y is rotated in the forward direction to execute the vibration mode (in step S21 of FIG. 10). When the controller 90 determines that the storage portion 61Y is full, the container body 33Y is rotated in the reverse direction to execute the vibration mode (in step S23 of FIG. 10). Then, after the vibration mode, the controller 90 increments the number of times N of executions by one (in step S22 of FIG. 10) and repeats the flow after step S2.

Third Modification

Figure 11:
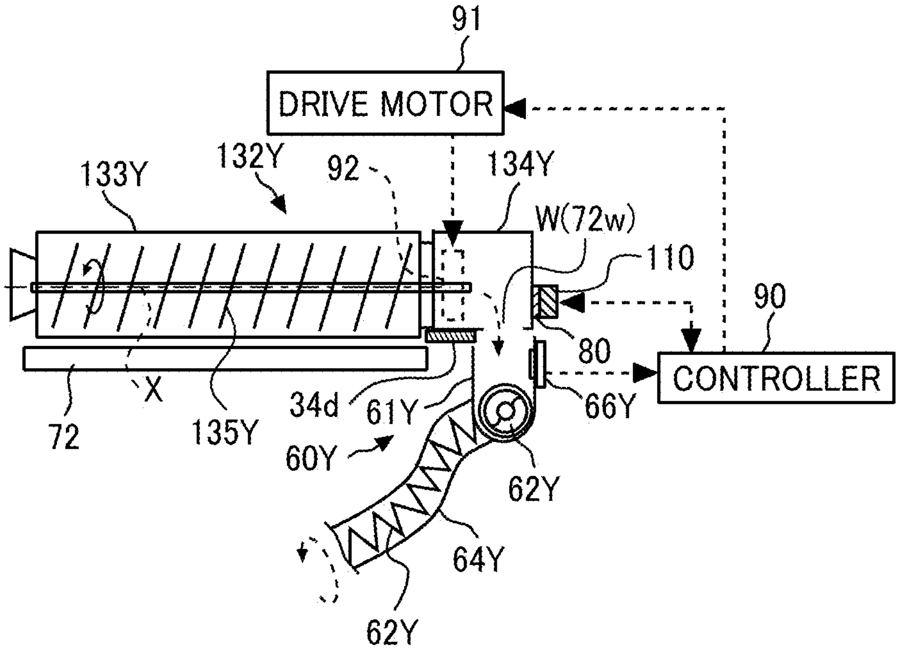
FIG. 11 is a diagram illustrating a state in which a toner container is installed in a toner supply device according to a third modification.

As illustrated in FIG. 11, a conveying screw 135Y serving as a developer conveyor rotatable around the rotation axis X is disposed inside a toner container 132Y (developer container) according to a third modification. That is, the toner container 132Y according to the third modification conveys the toner not by rotating a container body 133Y but by rotationally driving the conveying screw 135Y (developer conveyor) disposed in the non-rotating container body 133Y by the drive motor 91. Specifically, when the conveying screw 135Y is driven by the drive motor 91 to rotate, the toner conveyed by the conveying screw 135Y is discharged from the opening portion 33*a* of the container body 133Y. Thus, the toner is stored in the storage portion 61Y via a cap 134Y. In the third modification, the vibration mode is a control mode in which the conveying screw 135Y (developer conveyor) is driven to rotate. When such a vibration mode is executed, various controls described above with reference to FIGS. 8 to 10 can be executed. Also in the third modification, the occurrence of the communication failure between the toner container 32Y (ID chip 80) and the apparatus body of the image forming apparatus 100 (controller 90) can be prevented.

As described above, according to the present embodiment, the toner container 32Y (developer container) in which the ID chip 80 (data recording medium) is disposed is detachably attached in the apparatus body of the image forming apparatus 100. The apparatus body of the image forming apparatus 100 is provided with the contact terminals 112 that communicably contact the ID chip 80 of the toner container 32Y attached in the apparatus body of the image forming apparatus 100. The controller 90 (detector) that detects the communication failure between the ID chip 80 and the apparatus body of the image forming apparatus 100 is disposed. When the communication failure is detected by the controller 90 (serving as a detector), the controller 90 executes the vibration mode (as a control mode) in which vibration is applied to the ID chip 80. As a result, the occurrence of the communication failure between the toner container 32Y (or the ID chip 80) and the apparatus body of the image forming apparatus 100 (or the controller 90) can be prevented.

In the present embodiment, the image forming apparatus 100 has been described in which the toner container 32Y serving as a developer container in which the toner (one component developer) serving as a developer is stored is detachably attached. Alternatively, the present disclosure can also be applied to an image forming apparatus in which a developer container storing a two-component developer (developer including toner and carrier) as a developer is detachably attached, or an inkjet-type image forming apparatus in which a developer container storing ink as a developer is detachably attached. Although the ID chip 80 is used as the data recording medium in the present embodiment, the data recording medium is not limited thereto. For example, an integrated circuit (IC) chip, a radio frequency identification (RFID), a printed circuit board, or an integrated circuit (IC) tag, may be used as the data recording medium. The contact terminals 112 in the apparatus body of the image forming apparatus 100 are not limited to that of the present embodiment. Anything that contact the data recording medium in a communicable manner may be used. In the present embodiment, when the toner container 32Y is attached to the apparatus body of the image forming apparatus 100, the controller 90 (detector) detects whether the communication failure has occurred and executes the vibration mode (control mode) as necessary. However, the timing of detecting whether the communication failure has occurred is not limited thereto. Even in such a case, the substantially same effect as that of the present embodiment can be obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:
an apparatus body;
a developer container detachably attached in the apparatus body;
a data recording medium on the developer container;
a contact terminal disposed in the apparatus body, the contact terminal configured to contact the data recording medium;
a detector configured to detect a communication failure between the data recording medium and the apparatus body;
control circuitry configured to execute a control mode to vibrate the data recording medium when the detector detects the communication failure; and
wherein the control mode is a control mode to drive the developer container.

2. The image forming apparatus according to claim 1,
wherein the detector is configured to detect whether the communication failure occurs when the developer container is attached to the apparatus body.

3. The image forming apparatus according to claim 1,
wherein the developer container includes a container body having an inner surface with a spiral projection, the container body being rotatable around a rotation axis of the container body to discharge developer from a discharge port of the container body, and
wherein the control mode is to drive the container body to rotate the container body.

4. The image forming apparatus according to claim 3,
wherein the container body has a protruding portion on a part of an outer circumferential surface of the container body.

5. The image forming apparatus according to claim 4,
wherein the container body includes a head portion having the discharge port,
wherein the developer container includes a non-rotatable cap covering the head portion of the container body,
wherein the container body is supported by the non-rotatable cap at a position away from the head portion toward a bottom portion of the container body, and
wherein the data recording medium is disposed on an end face of a projecting end of the cap.

6. The image forming apparatus according to claim 3,
wherein the data recording medium is disposed in a non-rotatable manner at a position away from the rotation axis of the container body.

7. The image forming apparatus according to claim 1,
wherein the developer container includes a developer conveyor rotatable around a rotation axis of the container body inside the developer container, and
wherein the control mode is to drive the developer conveyor to rotate the developer conveyor.

8. The image forming apparatus according to claim 1,
wherein the control mode is to drive the developer container to convey the developer inside the developer container toward a discharge port of the container body.

9. The image forming apparatus according to claim 1, further comprising a storage portion configured to store the developer discharged from the developer container,
wherein the control circuitry is configured to not execute the control mode in response to a detection that the developer stored in the storage portion has reached a specified amount.

10. The image forming apparatus according to claim 1,
wherein the control mode is to drive the developer container to convey the developer inside the developer container in a direction away from a discharge port of the container body.

11. The image forming apparatus according to claim 1,
wherein the control mode is to drive the developer container to switch a conveyance direction of the developer inside the developer container between a direction toward a discharge port of the container body and a direction away from the discharge port.

12. The image forming apparatus according to claim 11, further comprising a storage portion configured to store the developer discharged from the developer container,
wherein the control circuitry is configured to execute the control mode to drive the developer container to convey the developer in the direction toward the discharge port when the developer stored in the storage portion has not reached a specified amount, and
wherein the control circuitry is configured to execute the control mode to drive the developer container to convey the developer in the direction away from the discharge port when the developer stored in the storage portion has reached the specified amount.

13. The image forming apparatus according to claim 1,
wherein the control circuitry is configured to execute the control mode again when the detector detects the communication failure immediately after the control circuitry executes the control mode for a specified time.

14. The image forming apparatus according to claim 13,
wherein the control circuitry is configured to execute the control mode within a specified number of times.

* * * * *